(12) United States Patent
Joo

(10) Patent No.: US 6,497,096 B1
(45) Date of Patent: Dec. 24, 2002

(54) AUTOMATIC TRANSMISSION FOR AUTOMOBILES

(76) Inventor: Jin-yong Joo, 201 Artvilla, 586 Yanghi-dong, Sujeong-ku, Seongnam-city, Dyunggi-do 461-259 (KR)

( * ) Notice: Subject to any disclaimer, the term of this patent is extended or adjusted under 35 U.S.C. 154(b) by 0 days.

(21) Appl. No.: 09/806,016

(22) PCT Filed: Sep. 22, 1999

(86) PCT No.: PCT/KR99/00580

§ 371 (c)(1),
(2), (4) Date: Mar. 23, 2001

(87) PCT Pub. No.: WO00/17536

PCT Pub. Date: Mar. 30, 2000

(30) Foreign Application Priority Data

Sep. 23, 1998 (KR) .............................................. 98-39373
Sep. 13, 1999 (KR) .............................................. 98-39057

(51) Int. Cl.[7] ............................................. F16D 33/00
(52) U.S. Cl. .............................. 60/354; 60/357; 60/368
(58) Field of Search .......................... 60/330, 347, 352, 60/354, 364, 357, 355, 356, 368; 416/155

(56) References Cited

U.S. PATENT DOCUMENTS

| | | | | | |
|---|---|---|---|---|---|
| 1,881,082 A | * | 10/1932 | Kiep | ............................ | 60/357 |
| 1,957,124 A | * | 5/1934 | Yahn | ............................ | 62/357 |
| 2,179,519 A | * | 11/1939 | Popper | ...................... | 60/357 X |
| 2,533,148 A | * | 12/1950 | Spiegel | ......................... | 60/354 |
| 2,574,492 A | * | 11/1951 | Nowak | ......................... | 60/354 |
| 2,634,830 A | * | 4/1953 | Cline | ......................... | 60/357 X |
| 2,640,680 A | * | 6/1953 | Altheide | ................... | 60/354 X |
| 3,358,444 A | * | 12/1967 | Tuck | ............................ | 60/354 |
| 3,425,220 A | * | 2/1969 | Egbert et al. | ................... | 60/354 |
| 3,635,583 A | * | 1/1972 | Chilman et al. | ............... | 416/48 |
| 4,004,660 A | * | 1/1977 | Shore et al. | ................... | 60/357 |
| 4,023,362 A | * | 5/1977 | Rogner et al. | ................. | 60/347 |
| 5,150,859 A | * | 9/1992 | Ransick | ........................ | 244/58 |

* cited by examiner

Primary Examiner—John E. Ryznic
(74) Attorney, Agent, or Firm—R W Becker & Associates; R W Becker

(57) ABSTRACT

An automatic transmission for automobiles is disclosed. In the automatic transmission, a housing (1) is filled with transmission fluid. A pump (2), having an input shaft (6), is positioned at one side within the housing (1), while a turbine (3), having an output shaft (7), is positioned at the other side within the housing (1) while being opposed to the pump (2). Pluralities of turbine blades (3a), regularly arranged around the turbine (3), are changeable in their inclination angles relative to the axis of the output shaft (7) so as to allow the rotating speed to be changeable. A hydraulic pressure control unit controls the inflow and out flow of the transmission fluid for the housing (1) while controlling the hydraulic pressure within the housing. An air control valve (5) controls the inflow and outflow of air relative to the housing (1) in response to the inflow and outflow of the transmission fluid relative to the housing (1). A transmission control unit (TCU) controls both the hydraulic pressure within the housing (1) and the inclination angle of the turbine blades (3a) in accordance with operation conditions of an engine and a desired running speed of an automobile.

8 Claims, 3 Drawing Sheets

AUTOMATIC TRANSMISSION FOR AUTOMOBILES

TECHNICAL FIELD

The present invention relates, in general, to transmissions for automobiles and, more particularly, to an automatic transmission, designed to transmit the rotating force of an internal combustion engine to axles using the operational theory of a hydraulic clutch, and to accomplish a desired transference of force from the engine to the axles while automatically changing the speed by automatically controlling the hydraulic pressure within the clutch in addition to controlling the adjustable angle of turbine blades of the clutch in accordance with both the engine speed and the running speed of an automobile.

BACKGROUND ART

As well known to those skilled in the art, conventional hand transmissions for automobiles are designed to force a driver to appropriately change the position of a shift lever between several stages by hand while controlling a clutch pedal with a foot in accordance with the operational conditions of an engine and the running speed of an automobile. However, such a shift lever control motion in addition to the clutch pedal control motion is somewhat difficult to unskilled drivers since it is not easy for such drivers to determine the operational conditions of the engine or the running speed of the automobile. The shift lever control motion in addition to the clutch pedal control motion is also inconvenient to skilled drivers and is fatiguing to drivers while driving a car.

Therefore, drivers recently prefer automobiles with automatic transmissions to automobiles with manual transmissions.

In a conventional automatic transmission for automobiles, a hydraulic clutch or a torque converter is installed on the power transmitting path between an engine and the transmission, and so the transmission undesirably has a large size and a complex construction, increasing the production cost of an automobile. It is also very difficult to install such a conventional automatic transmission in an automobile. Another problem, experienced in the conventional automatic transmission, resides in that it is necessary to provide a large area within the automobile for the large-sized transmission.

DISCLOSURE OF THE INVENTION

Accordingly, the present invention has been made keeping in mind the above problems occurring in the prior art, and an object of the present invention is to provide an automatic transmission for automobiles, which has a simple construction and a small size capable of reducing the production cost of an automobile, and which is also designed for easy installation of the transmission on a small area within the automobile.

In order to accomplish the above object, the present invention provides an automatic transmission for automobiles, comprising: a housing filled with transmission fluid; a pump positioned at a first side within the housing and integrated with one end of an input shaft connected to an engine crank shaft, the pump being rotated along with the input shaft; a turbine positioned at a second side within the housing while being opposed to the pump, with both an output shaft integrally extending from the turbine to the outside of the housing and a plurality of turbine blades being regularly arranged around the turbine, the turbine blades being changeable in their inclination angles relative to an axis of the output shaft so as to allow a rotating speed to be changeable when a rotating force of the pump is transmitted to the turbine through the transmission fluid; a hydraulic pressure control unit used for controlling inflow and outflow of the transmission fluid for the housing while controlling a hydraulic pressure within the housing; an air control valve used for controlling inflow and outflow of air relative to the housing in response to the inflow and outflow of the transmission fluid relative to the housing; and a transmission control unit (TCU) used for controlling both the hydraulic pressure within the housing and the inclination angle of the turbine blades in accordance with operational conditions of an engine and a desired running speed of an automobile.

BRIEF DESCRIPTION OF THE DRAWINGS

The above and other objects, features and other advantages of the present invention will be more clearly understood from the following detailed description taken in conjunction with the accompanying drawings, in which.

BET MODE FOR CARRYING OUT THE INVENTION

Figure 1:
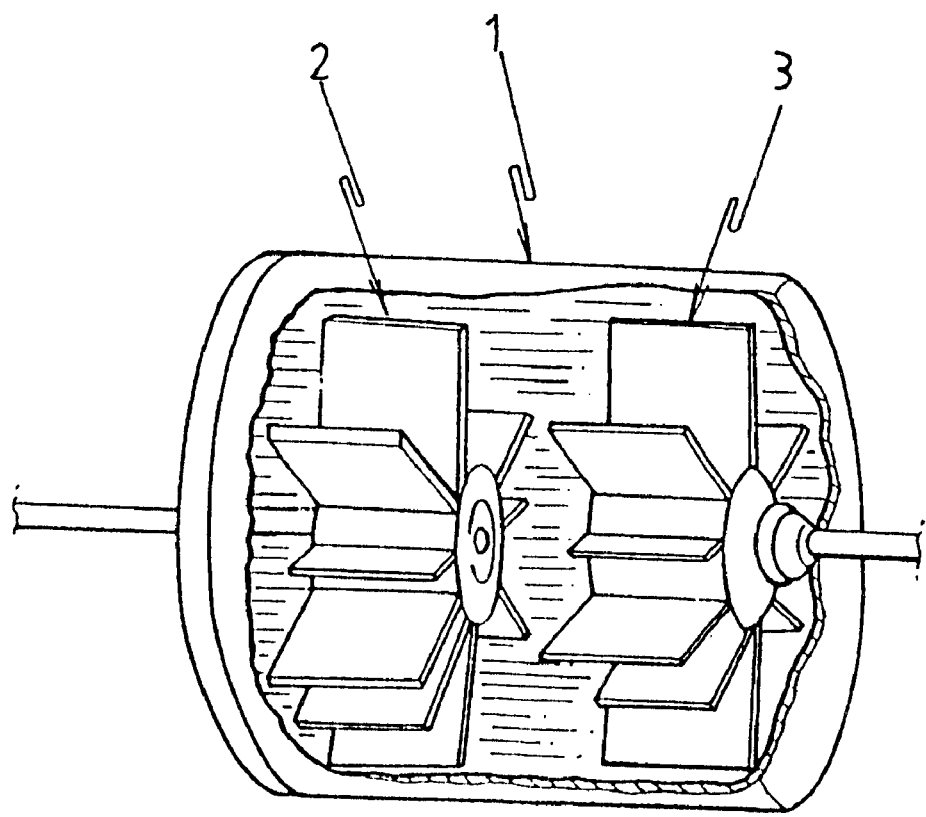
FIG. 1 is a partially broken perspective view, showing the conventional power transmission theory of transference of rotating force of a pump to a turbine through transmission fluid.
Figure 2:
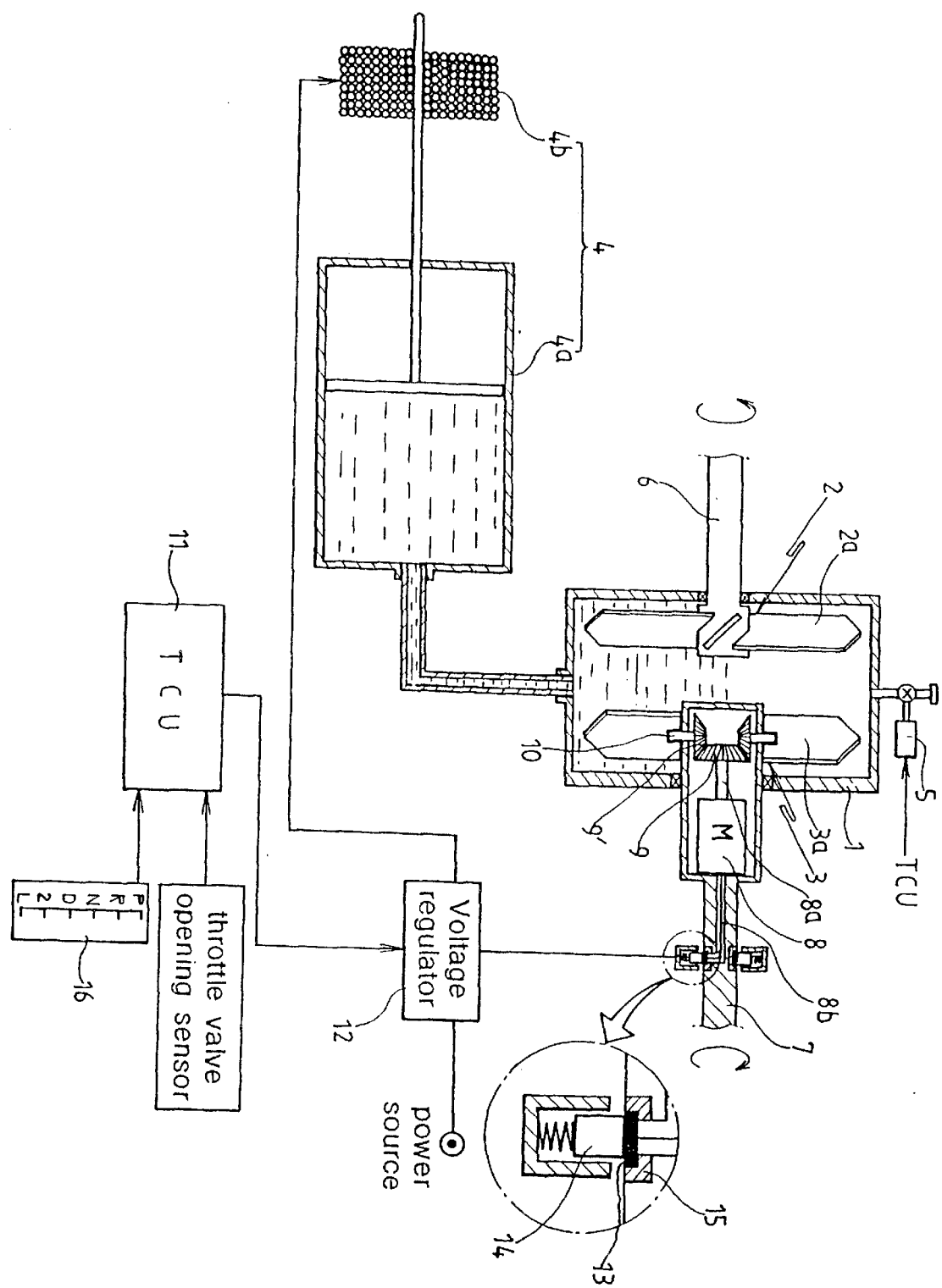
FIG. 2 is a diagram, showing the construction of an automatic transmission in accordance with the preferred embodiment of the present invention.
Figure 3A:
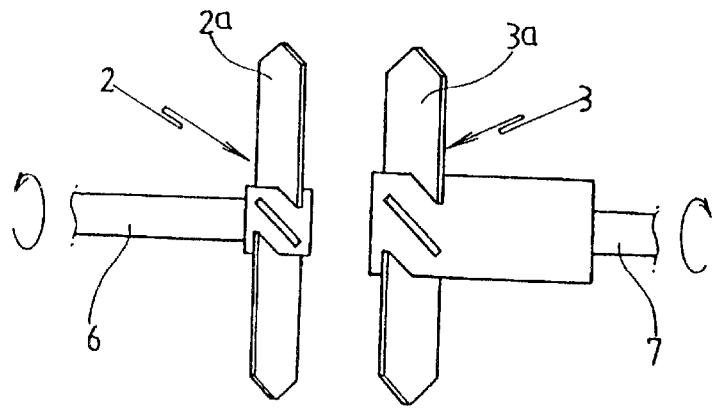
FIGS. 3a to 3c are views, showing the operation of the transmission of this invention, with the turbine blades being changed in their inclination angles relative to the axis of an output shaft during the operation of the transmission.
Figure 3B:
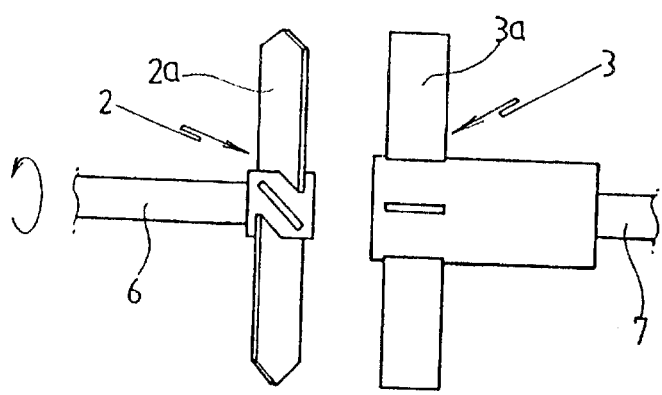
Figure 3C:
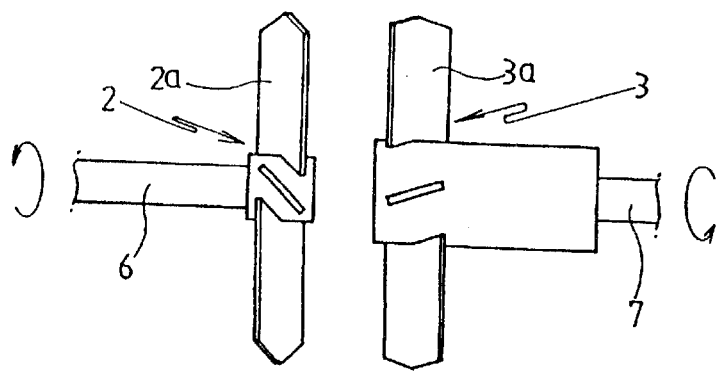

FIG. 1 shows the conventional power transmission theory of transference of rotating force of a pump to a turbine through transmission fluid. FIG. 2 is a diagram, showing the construction of an automatic transmission for automobiles in accordance with the preferred embodiment of this invention. FIGS. 3a to 3c show the operation of the transmission of this invention, with the turbine blades being changed in their inclination angles relative to the axis of the output shaft during the operation of the transmission.

As shown in FIG. 1, a pump 2 with an input shaft and a turbine 3 with an output shaft are oppositely positioned within a housing 1 filled with transmission fluid. When the pump 2 is rotated, the turbine 3 is rotated due to kinetic energy of the transmission fluid inside the housing 1. The automatic transmission of this invention uses the above-mentioned power transmission theory using such transmission fluid.

As shown in FIG. 2, the transmission of this invention comprises a housing 1 filled with transmission fluid. A pump 2 is positioned at one side within the housing 1. The above pump 2 is integrated with one end of an input shaft 6 that is connected to an engine crank shaft (not shown), and so the pump 2 is rotated along with the input shaft 6. A turbine 3 is positioned at the other side within the housing 1 while being opposed to the pump 2. An output shaft 7 integrally extends from the turbine 3 to the outside of the housing 1, with a plurality of blades 3a being regularly arranged around the turbine 3. The above turbine blades 3a are designed to be variable in their inclination angles relative to the axis of the output shaft 7 so as to allow the rotating speed to be changeable when the rotating force of the pump is transmitted to the turbine 3 through the transmission fluid. A hydraulic pressure control unit 4 is provided in the transmission of this invention for controlling the inflow and outflow of the transmission fluid for the housing 1 while controlling the hydraulic pressure within the housing 1. An air control valve 5 controls the inflow and outflow of air relative to the housing 1 in response to the inflow and outflow of the transmission fluid relative to the housing 1. The transmission also has a TCU (transmission control unit) 11, which controls both the hydraulic pressure within the housing 1 and the inclination angle of the turbine blades 3*a* in accordance with the operational conditions of the engine and/or the running speed of an automobile.

In FIGS. 2, 3*a*, 3*b* and 3*c*, the pump 2 and the turbine 3 each are shown having four blades 2*a*, 3*a*. However, it should be understood that the number of each of the pump blades 2*a* and the turbine blades 3*a* is not limited to the number shown in the drawings.

As shown in the drawings, the pump blades 2*a* are fixed to the input shaft 6 while being inclined to the axis of the shaft 6 at an angle of about 45°. The turbine blades 3*a* are designed to be inclined to the axis of the output shaft 7.

In order to adjust the inclination angle of the turbine blades 3*a* relative to the axis of the output shaft 7, a step motor 8 is installed within the hollow interior of the output shaft 7 so as to be rotatable along with the output shaft 7. A drive bevel gear 9 is integrated with the shaft 8*a* of the step motor 8. Four driven bevel gears 9' commonly engage with the drive bevel gear 9 so as to transmit the rotating force of the motor shaft 8*a* to four driven bevel gear shafts 10 while changing the power transmitting direction at right angles. The above four driven bevel gears 9' individually form the shaft of each driven bevel gear 9' and are respectively connected to the centers of the turbine blades 3*a*.

The electric power for the step motor 8 is output from a voltage regulator 12 under the control of the TCU 11. In order to allow the electric power from the voltage regulator 12 to be applied to the step motor 8, the electric wire 8*b* of the step motor 8 passes through the hollow output shaft 7 prior to being connected to an annular terminal 13 exposed to the external surface of the shaft 7. The above annular terminal 13 is normally brought into close contact with a brush 14 biased toward the terminal 13 by a compression coil spring. An insulating material 15 is provided along both edges of the annular terminal 13, thus almost completely insulating the annular terminal 13 from the output shaft 7.

Therefore, electric power from the voltage regulator is applied to the step motor 8 through the brush 14, the annular terminal 13 and the electric wire 8*b*.

The hydraulic pressure control unit 4 comprises a hydraulic cylinder 4*a*, which controls the pressurized transmission fluid for the housing 1. The operation of the hydraulic cylinder 4*a* is controlled by a solenoid 40 valve 4*b*. The above solenoid valve 4*b* is operated by the voltage regulator 12, which is controlled by the TCU 11.

The piston within the hydraulic cylinder 4*a* moves to the right in FIG. 2 and pressurizes the transmission fluid for the housing 1 in proportion to the forward voltage applied from the voltage regulator 12 to the solenoid valve 4*b*. Therefore, the hydraulic pressure within the housing 1 is increased in proportion to the forward voltage for the solenoid valve 4*b*.

In the automatic transmission of this invention, the transmission fluid within the housing 1 is completely drained when a shift lever 16 is placed at a neutral position. That is, in the case of such a neutral position of the shift lever, a backward voltage is applied from the voltage regulator 12 to the solenoid valve 4*b*, thus allowing the piston to completely move to the left within the cylinder 4*a* in FIG. 2.

The air control valve 5 is operated under the control of the TCU 11 in a way such that the air control valve 5 is opened in the case of inflow and outflow of air relative to the housing 1, and is closed in the case of pressurizing the transmission fluid within the housing 1.

The above automatic transmission is operated as follows.

When the shift lever 16 is shifted to the neutral position "N", the TCU 11 senses the neutral position of the lever 16 and opens the air control valve 5. In addition, the TCU 11 controls the solenoid valve 4*b* and completely moves the piston to the left within the cylinder 4*a* in FIG. 2. In such a case, the transmission fluid within the housing 1 is almost completely drained from the housing 1, and so the rotating force of the pump 2 is not transmitted to the turbine 3. That is, the output shaft 7 in the case of the neutral position of the shift lever 16 is not rotated regardless of the rotating motion of the input shaft 6. Therefore, a desired neutral position of the transmission is accomplished.

When the shift lever 16 is shifted to the drive position "D", the TCU 11 senses the drive position of the 40 lever 16 and opens the air control valve 5. In addition, the TCU 11 controls the solenoid valve 4*b* and forces the piston to move to the right by a distance within the cylinder 4*a* in FIG. 2, and so the housing 1 is almost completely filled with the transmission fluid. Therefore, the rotating force of the pump 2 is transmitted to the turbine 3, thus rotating the output shaft 7. A desired drive position of the transmission is thus accomplished. In the above drive position of the transmission, the automobile moves forward even when the accelerator pedal is not operated by a driver if the driver does not operate the brake pedal.

When the accelerator pedal is operated, an engine throttle valve is opened. In such a case, the automatic transmission of this invention automatically controls both the hydraulic pressure within the housing 1 and the inclination angle of the turbine blades 3*a* in accordance with the opening ratio of the throttle valve, or both the engine load and the desired running speed of the automobile. That is, the transmission of this invention automatically performs a speed changing operation.

In an experiment, it is noted that the kinetic energy of the transmission fluid within the housing 1 is changed in proportion to the hydraulic pressure within the housing 1. Therefore, the hydraulic pressure within the housing 1 is increased in proportion to the engine load or the desired running speed of the automobile.

In order to increase the hydraulic pressure within the housing 1, the TCU 11 controls the voltage regulator 12 so as to allow an appropriate voltage to be applied to the solenoid valve 4*b*, thus finally moving the piston to the right in FIG. 2 by a desired distance within the cylinder 4*a*.

When the turbine blades 3*a* are positioned at an inclination angle of 45° relative to the axis of the output shaft 7 as shown in FIG. 3*a*, the rotating force of the pump 2 is most effectively transmitted to the turbine 3. On the other hand, when the turbine blades 3*a* are positioned in parallel to the axis of the output shaft 7 as shown in FIG. 3*b*, the rotating force transmitted to the turbine 3 is most reduced.

When the shift lever 16 is shifted to the reverse position "R", the TCU 11 senses the reverse position of the lever 16 and controls the turbine blades 3*a* so as to place the turbine blades 3*a* at inversely inclined positions relative to the axis of the output shaft 7 as shown in FIG. 3*c*. Therefore, the output shaft 7 is rotated in an inverse direction, and so the automobile moves backward.

In order to control the inclination angle of the turbine blades 3a relative to the axis of the output shaft 7, the TCU 11 controls the voltage regulator 12, thus allowing the voltage regulator 12 to apply an appropriate forward or backward voltage to the step motor 8 of the turbine 3.

In a brief description, the TCU 11 of the automatic transmission of this invention automatically and appropriately controls both the hydraulic pressure within the housing 1 and the inclination angle of the turbine blades 3a relative to the axis of the output shaft 7 in accordance with both the engine load and the running speed of the automobile, thus finally performing a desired automatic speed changing operation.

Industrial Applicability

As described above, the present invention provides an automatic transmission for automobiles. The automatic transmission of this invention has a simple construction and a small size capable of reducing the production cost of automobiles. Another advantage of the transmission of this invention resides in that it is easily installed on a small area within an automobile.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic transmission for automobiles, comprising:
    a housing filled with transmission fluid;
    a pump positioned at a first side within said housing and integrated with one end of an input shaft connected to an engine crank shaft, said pump being rotated along with the input shaft;
    a turbine positioned at a second side within the housing while being opposed to said pump, with both an output shaft integrally extending from the turbine to the outside of said housing and a plurality of turbine blades being regularly arranged around the turbine, said turbine blades being changeable in their inclination angles relative to an axis of the output shaft so as to allow a rotating speed to be changeable when a rotating force of said pump is transmitted to the turbine through the transmission fluid;
    a hydraulic pressure control unit used for controlling inflow and outflow of the transmission fluid for the housing while controlling a hydraulic pressure within the housing;
    an air control valve used for controlling inflow and outflow of air relative to the housing in response to the inflow and outflow of the transmission fluid relative to the housing; and
    a transmission control unit (TCU) used for controlling both the hydraulic pressure within the housing and the inclination angle of the turbine blades in accordance with operational conditions of an engine and a desired running speed of an automobile.

2. The automatic transmission according to claim 1, wherein said hydraulic pressure control unit comprises:
    a hydraulic cylinder used for controlling the inflow and outflow of the transmission fluid for said housing, and for draining the transmission fluid from the housing with a shift lever being shifted to a neutral position; and
    a solenoid valve used for controlling an operation of said hydraulic cylinder.

3. The automatic transmission according to claim 1, wherein the inclination angle of the turbine blades relative to the axis of the output shaft is controlled by a blade control means, said blade control means comprises:
    a step motor installed within a hollow interior of said output shaft;
    a drive bevel gear integrated with a shaft of the step motor;
    four driven bevel gears commonly engaging with the drive bevel gear so as to transmit a rotating force of the motor shaft to four driven bevel gear shafts while changing the power transmitting direction at right angles, said four driven bevel gears individually forming a shaft of each of the four driven bevel gears and being respectively connected to centers of said turbine blades.

4. An automatic transmission for a vehicle, comprising:
    a housing fillable with transmission fluid;
    a pump positioned at a first side within the housing and integrated with one end of an input shaft connected to an engine crank shaft, the pump being rotated along with the input shaft;
    a turbine positioned at a second side within the housing while being opposed to the pump, with both an output shaft integrally extending from the turbine to the outside of the housing and a plurality of turbine blades being regularly arranged around the turbine;
    means for varying the rate of rotation of the output shaft including means for selectively changing the inclination angle of the turbine blades relative to an axis of the output shaft such that the rotating force of the pump transmitted to the turbine through the transmission fluid is varied;
    means for influencing the torque transferred from the pump to the turbine through the transmission fluid including a hydraulic pressure control unit used for controlling the inflow of the transmission fluid into the housing and the outflow of the transmission fluid from the housing to thereby control the hydraulic pressure within the housing;
    an air control valve for controlling inflow of air into the housing and outflow of air from the housing;
    a transmission control unit;
    means for providing the transmission control unit with an indication of a desired torque to be transmitted from the pump to the turbine, the transmission control unit controlling the air control valve, in response to a neutral torque indication indicating that the desired torque to be transmitted from the pump to the turbine is to be substantially non-existent, to permit the inflow of air into the housing, whereby the outflow of the transmission fluid from the housing is facilitated; and
    means for providing the transmission control unit with an indication of a desired vehicle speed, the transmission control unit controlling the operation of the torque influencing means in coordination with the operation of the means for varying the rotation of the output shaft such that, at each time a given desired vehicle speed is provided to the transmission control unit, the torque influencing means is controlled by the transmission control unit to achieve the respective desired torque which has been indicated to the transmission control unit at that time while the means for varying the rotation of the output shaft is controlled by the transmission control unit to achieve the desired vehicle speed.

5. An automatic transmission for a vehicle according to claim 4, wherein the hydraulic pressure control unit includes a hydraulic cylinder for controlling the inflow of the transmission fluid into the housing and the outflow of the transmission fluid from the housing including controlling a draining outflow of the transmission fluid from the housing in response to a neutral torque indication indicating that the desired torque to be transmitted from the pump to the turbine is to be substantially non-existent.

6. An automatic transmission for a vehicle according to claim 5, wherein the hydraulic pressure control unit includes a solenoid valve for controlling an operation of the hydraulic cylinder.

7. An automatic transmission for a vehicle according to claim 4, wherein the means for varying the rotation of the output shaft includes a step motor installed within a hollow interior of the,output shaft, a drive bevel gear integrated with a shaft of the drive motor, and a plurality of driven bevel gears commonly engaging with the drive bevel gear so as to transmit a rotating force of the step motor shaft to the driven bevel gears.

8. An automatic transmission for a vehicle according to claim 4, wherein the hydraulic pressure control unit includes a hydraulic cylinder for controlling the inflow of the transmission fluid into the housing and the outflow of the transmission fluid from the housing including controlling a draining outflow of the transmission fluid from the housing in response to a neutral torque indication indicating that the desired torque to be transmitted from the pump to the turbine is to be substantially non-existent, the hydraulic pressure control unit includes a solenoid valve for controlling an operation of the hydraulic cylinder, and the means for varying the rotation of the output shaft includes a step motor installed within a hollow interior of the output shaft, a drive bevel gear integrated with a shaft of the drive motor, and a plurality of driven bevel gears commonly engaging with the drive bevel gear so as to transmit a rotating force of the step motor shaft to the driven bevel gears.

* * * * *